Sept. 17, 1929.　　O. K. KJOLSETH　　1,728,832
RESTRAINING DEVICE
Filed March 31, 1928
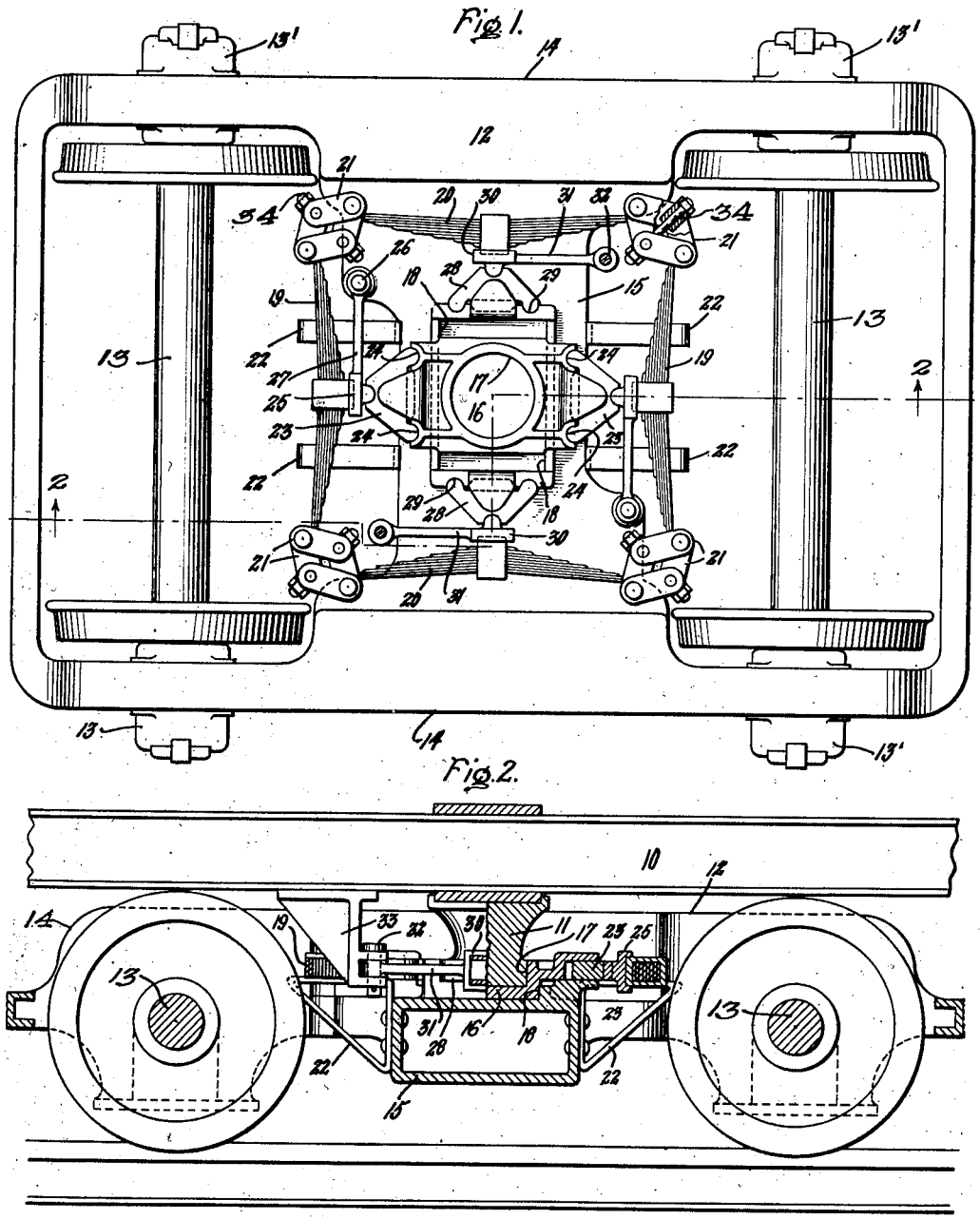
Inventor:
Ole K. Kjolseth,
by Charles E. Tullar
His Attorney.

UNITED STATES PATENT OFFICE

OLE K. KJOLSETH, OF SCOTIA, NEW YORK, ASSIGNOR TO GENERAL ELECTRIC COMPANY, A CORPORATION OF NEW YORK

RESTRAINING DEVICE

Application filed March 31, 1928. Serial No. 266,305.

My invention relates generally to locomotives or cars and more particularly to restraining devices for controlling the movement of a pivoted truck thereof relative to the underframe of a locomotive or car.

In constructing locomotives or cars pivoted guiding trucks are usually provided to resist swaying or "nosing" of the same at high speeds and also to facilitate traversing a curve in the track by exerting a turning moment on the front end of the locomotive or car. Ordinarily the trucks are spaced apart longitudinally of the frame of the locomotive or car so that in order to round a curve in the truck it is necessary that the trucks be attached to the frame in such manner that they can move laterally with respect thereto, as well as turn on their pivotal connections to the underframe. During operation of a locomotive or car of this type unevenness in the track tends to set up oscillation of the trucks relative to the underframe which causes objectionable swaying or "nosing" of the platform structure on the trucks. For this reason restraining devices have been employed for either centering the pivoted trucks laterally with respect to the frame or resiliently resisting turning of the pivoted trucks from their position in longitudinal alignment with the underframe. However, the mechanical construction of these restraining devices has been such that both turning and lateral restraint of the trucks could not be provided because of space requirements.

The object of my invention is to provide a restraining device for the pivoted trucks of a locomotive or car which will restrain lateral movement of the truck from a position centrally of the platform structure thereof, and also restrain turning of the truck on its pivotal connection to the underframe from a position in longitudinal alignment therewith, so as to resist swaying of the platform structure on the trucks. I accomplish this by arranging means including a plurality of springs between the underframe of the platform structure and the truck for centering the truck laterally with respect to the underframe and for resisting turning of the truck from a position in longitudinal alignment therewith.

My invention will be more fully set forth in the following description referring to the accompanying drawing and the features of novelty which characterize my invention will be pointed out with particularity in the claims annexed to and forming a part of this specification.

In the drawing, Fig. 1 is a plan view of a pivoted truck embodying my invention, and Fig. 2 is a sectional view on the line 2—2 of Fig. 1.

Referring to the drawing, the locomotive or car in connection with which I have shown my invention comprises a platform structure 10 having a center pin 11 attached thereto which is adapted to pivotally support the platform structure on a truck 12. The truck may be of any convenient form but in this instance it comprises wheels and axles 13 having journal boxes 13' arranged in the pedestal yokes of side frames 14 which are connected together by a cross tie beam 15. The platform structure is pivotally supported on the truck in such manner that it can move laterally with respect thereto toward either side of the center thereof as required when the locomotive or car traverses a curve. This can be done in any desired manner, but in the construction illustrated by way of example, it is done by supporting the platform structure on the truck by a center plate 16 having a cylindrical seat 17 rotatably engaging the center pin 11 and slidably fitting a guideway 18 which is formed in the cross tie beam 15 and which extends transversely of the truck and parallel to the axles thereof.

In operating a locomotive or car of this construction there is a tendency for the pivoted trucks to oscillate on their connections to the platform structure due to unevenness in the track which causes swaying or "nosing" of the platform structure. This is objectionable as it subjects the track to excessive lateral stresses and also causes rapid wearing of the wheel flanges. In accordance with my invention this tendency to sway is resisted by arranging interconnected springs for centering the truck transversely with respect to the frame of the locomotive or car and also resisting turning of the truck from a position in longitudinal alignment therewith, so that the trucks can turn and move laterally with respect to the platform structure as required in rounding a curve. In the construction shown, I do this by arranging a plurality of leaf springs 19 and 20 about the center plate 16, which are connected together by links 21 and which are supported on the cross tie beam 15 and brackets 22 attached thereto. The springs 19 resiliently center the center plate 16 with respect to the truck by the action of two rockers 23 engaging seats 24 and bearing members 25 having integrally formed links 27 which are pivotally connected at 26 to the truck frame. The springs 19 and rockers 23 are proportioned so as to place the springs under an initial stress so that the rockers are normally retained in engagement with the seats 24 and the center plate 16 is resiliently centered with respect to the truck. In order to provide for adjusting the tension of the springs 19 and 20 the links 21 are provided with adjusting bolts 34, as shown in Fig. 1. Whenever the center pin moves the center plate in the guideway 18 toward either side of this position, the rockers 23 are tilted out of engagement with the seats 24 on the side toward which the center plate moves and this causes the force of the spring 19 to urge the center plate toward the center of the truck. The springs 20 are utilized to resist turning of the truck from a position in longitudinal alignment with the frame by the action of rockers 28 engaging seats 29 formed on portions of the truck at the ends of the guideway 18 and bearing members 30 which are seated on the springs 20. These bearing members are formed with integral links 31 which are pivotally connected at 32 to a bracket 33 attached to the underframe of the locomotive or car. The links 31 are placed so that when the truck is in longitudinal alignment with the frame of the locomotive or car, the rockers 28 are in engagement with the seats 29. By this arrangement when the truck is turned from its position in longitudinal alignment with the underframe the movement of the truck relative thereto causes the links 31 to tilt the rockers so that they disengage the seats 29 on the side toward which the truck is turning, as viewed in Fig. 1. This causes the springs 20 and rockers 28 to exert a moment restraining turning of the truck from its position in longitudinal alignment with the frame and tending to restore it to this position. Ordinarily these restraining devices act simultaneously to resist turning and lateral movement of the center plates on the trucks and the forces acting thereon will be distributed between the springs 19 and 20 by the connecting links 21 which utilize effectively all of the springs.

It will thus be seen that I have provided a simple and compact device for resiliently restraining lateral displacement of the truck of a locomotive or car relative to the underframe thereof and also turning of the truck from its position in longitudinal alignment therewith. In this way swaying and "nosing" of the platform structure is resisted, as turning of the truck from a position in longitudinal alignment with the underframe as well as lateral movement of the truck relative to the underframe is resisted.

Although the restraining devices are particularly adapted for use together, either of them can be used without the other. Moreover, modifications of the form of my restraining device disclosed will occur to those skilled in the art so that I do not desire my invention to be limited to the construction shown and described except as defined in the appended claims.

What I claim as new and desire to secure by Letters Patent of the United States is:

1. In combination with a locomotive or car having a frame and a truck, means for pivotally connecting said truck to said frame, said connecting means being movable laterally of said truck, and means for resiliently centering said connecting means on said truck and for resiliently resisting turning of said truck on said pivotal connection from a position in longitudinal alignment with said frame, said centering and aligning means including a plurality of leaf springs connected together at the ends thereof and rockers for flexing said springs.

2. In combination with a locomotive or car having a frame and a truck, means for pivotally connecting said truck to said frame including a bearing member movable laterally on said truck, a plurality of leaf springs arranged about said bearing member and having their ends connected together, means for resiliently centering said bearing member on said truck including rockers arranged between the same and some of said springs, and means for resiliently resisting turning of said truck from a position in longitudinal alignment with said frame including rockers arranged between a portion of said truck and others of said springs.

3. In combination with a locomotive or car having a frame and a truck, means for pivotally connecting said truck to said frame including a bearing member movable laterally on said truck, a plurality of leaf springs arranged about said bearing member, and having their ends connected together, means for resiliently centering said bearing member on said truck including rockers connected to said truck and arranged between the same and some of said springs, and means for resiliently resisting turning of said truck from a position in longitudinal alignment with said frame including rockers connected to said frame and arranged between a portion of said truck and others of said springs.

4. In combination with a locomotive or car having a frame and a truck, means for pivotally connecting said truck to said frame, said connecting means being movable laterally of said truck, and means for resiliently centering said connecting means on said truck and for resiliently resisting turning of said truck from a position in longitudinal alignment with said frame, said centering and aligning means including a plurality of springs arranged about said connecting means and rockers arranged between said connecting means and said springs.

5. In combination with a locomotive or car having a frame and a truck, means for pivotally connecting said truck to said frame including a bearing member movable laterally on said truck, a plurality of springs arranged about said bearing member, means for resiliently centering said bearing member on said truck including rockers arranged between the same and some of said springs, and means for resiliently resisting turning of said truck from a position in longitudinal alignment with said frame including rockers arranged between portions of said truck and others of said springs.

6. In combination with a locomotive or car having a frame and a truck, means for pivotally connecting said truck to said frame including a bearing member movable laterally on said truck, a plurality of springs arranged about said bearing member, means for resiliently centering said bearing member on said truck including rockers connected to said truck and arranged between a portion of the same and some of said springs, and means for resiliently resisting turning of said truck from a position in longitudinal alignment with said frame including rockers connected to said frame and arranged between a portion of said truck and others of said springs.

7. In combination with a locomotive or car having a frame, a truck, and means for resiliently resisting turning of said truck relative to said frame, said means including a plurality of leaf springs connected together at the ends thereof and rockers arranged between said springs and a portion of said truck.

8. In combination with a locomotive or car having a frame, a truck, and means for resiliently resisting turning of said truck relative to said frame, said means including a plurality of leaf springs connected together at the ends thereof and rockers connected to said frame and arranged between said springs and a portion of said truck.

9. In combination with a locomotive or car having a frame and a truck, means for pivotally connecting said truck to said frame, and means for resiliently resisting turning of said truck from a position in longitudinal alignment with said frame, said aligning means including two parallel interconnected leaf springs arranged on opposite sides of said pivoted connecting means and rockers arranged between a portion of said truck and said springs.

10. In combination with a locomotive or car having a frame, a truck movable laterally with respect to said frame, and means for resiliently centering said truck with respect to said frame, said centering means including interconnected parallel leaf springs and rockers for flexing said springs.

11. In combination with a locomotive or car having a frame and a truck, a center plate for supporting said frame on said truck, a guide for said center plate extending transversely of said truck, and means for resiliently centering said center plate on said truck including springs arranged on opposite sides of said center plate and rockers arranged between said bearing member and each of said springs.

12. In combination with a locomotive or car having a frame and a truck, a center plate for supporting said frame on said truck, a guide slidably engaging said center plate and extending transversely of said truck, and means for resiliently centering said center plate on said truck including interconnected parallel leaf springs arranged on opposite sides of said bearing member and rockers arranged between said bearing member and each of said springs, said rockers being connected to said truck.

In witness whereof, I have hereunto set my hand this 30th day of March, 1928.

OLE K. KJOLSETH.